(12) United States Patent
Szolak et al.

(10) Patent No.: US 11,619,157 B2
(45) Date of Patent: Apr. 4, 2023

(54) EXHAUST GAS AFTERTREATMENT

(71) Applicant: FRAUNHOFER-GESELLSCHAFT ZUR FÖRDERUNG DER ANGEWANDTEN FORSCHUNG E.V., Munich (DE)

(72) Inventors: Robert Szolak, Freiburg (DE); Alexander Susdorf, Freiburg (DE); Florian Rümmele, Freiburg (DE)

(73) Assignee: Fraunhofer-Gesellschaft zur Förderung der angewandten Forschung e.V.

( * ) Notice: Subject to any disclaimer, the term of this patent is extended or adjusted under 35 U.S.C. 154(b) by 0 days.

(21) Appl. No.: 17/627,539

(22) PCT Filed: Jul. 15, 2020

(86) PCT No.: PCT/EP2020/070015
§ 371 (c)(1),
(2) Date: Jan. 14, 2022

(87) PCT Pub. No.: WO2021/009238
PCT Pub. Date: Jan. 21, 2021

(65) Prior Publication Data
US 2022/0316383 A1  Oct. 6, 2022

(30) Foreign Application Priority Data
Jul. 15, 2019 (DE) ............ 10 2019 210 415.0

(51) Int. Cl.
*F01N 3/36* (2006.01)
*F01N 3/20* (2006.01)
*F01N 3/30* (2006.01)

(52) U.S. Cl.
CPC .......... *F01N 3/208* (2013.01); *F01N 3/2066* (2013.01); *F01N 3/30* (2013.01); *F01N 3/36* (2013.01);
(Continued)

(58) Field of Classification Search
CPC ...... F01N 3/2073; F01N 3/36; F01N 2610/02; F01N 2610/03
See application file for complete search history.

(56) References Cited

U.S. PATENT DOCUMENTS

| 2002/0056273 A1* | 5/2002 | Itoh .................... B01D 53/9431 60/285 |
| 2008/0066451 A1* | 3/2008 | Warner ............... F01N 13/0093 60/285 |

(Continued)

FOREIGN PATENT DOCUMENTS

| EP | 1915518 B1 * 12/2010 ............. B01D 53/90 |
| EP | 2368024 A1    9/2011 |

(Continued)

OTHER PUBLICATIONS

International Search Report regarding PCT/EP2020/070015 dated Oct. 1, 2020.

*Primary Examiner* — Jonathan R Matthias
(74) *Attorney, Agent, or Firm* — Crowell & Moring LLP

(57) ABSTRACT

A method for exhaust gas aftertreatment is provided, the method comprising: a) providing a nitrogen oxide-containing raw exhaust gas, b) introducing the nitrogen oxide-containing raw exhaust gas into a catalytic evaporator (1), c) introducing a urea solution and a fuel into the catalytic evaporator (1), as a result of which a reducing agent is obtained, and d) supplying the reducing agent to an exhaust gas aftertreatment system (8). Alternatively or in addition, a device for producing a reducing agent may be provided, a reducing agent produced with same, and the use of these objects.

14 Claims, 5 Drawing Sheets

(52) U.S. Cl.
CPC ...... *F01N 2240/40* (2013.01); *F01N 2250/04* (2013.01); *F01N 2570/14* (2013.01); *F01N 2610/02* (2013.01); *F01N 2610/03* (2013.01)

(56) References Cited

U.S. PATENT DOCUMENTS

| | | | | |
|---|---|---|---|---|
| 2009/0257924 | A1* | 10/2009 | Dismon | F01N 3/2066 422/174 |
| 2011/0061374 | A1 | 3/2011 | Noritake | |
| 2011/0070134 | A1* | 3/2011 | Stakh | B01J 29/7615 422/171 |
| 2011/0258987 | A1* | 10/2011 | Miebach | F01N 3/206 60/299 |
| 2013/0055703 | A1* | 3/2013 | Toshioka | B01D 53/9495 60/301 |
| 2013/0064744 | A1* | 3/2013 | Yacoub | F01N 3/206 137/896 |
| 2017/0175603 | A1* | 6/2017 | Sun | F01N 3/2073 |
| 2018/0252136 | A1* | 9/2018 | Concetto Pesce | F01N 3/0253 |

FOREIGN PATENT DOCUMENTS

| | | | | | |
|---|---|---|---|---|---|
| EP | | 238845 | A1 | 11/2011 | |
| EP | | 2570625 | A1 | 3/2013 | |
| JP | | 2006009606 | A * | 1/2006 | ........... F01N 3/2066 |

\* cited by examiner

EXHAUST GAS AFTERTREATMENT

CROSS-REFERENCE TO RELATED APPLICATIONS

This application is a 371 nationalization of international patent application PCT/EP2020/070015 filed Jul. 15, 2020, which claims priority under 35 USC § 119 to German patent application DE 10 2019 210 415.0 filed Jul. 15, 2019. The entire contents of each of the above-identified applications are hereby incorporated by reference.

TECHNICAL FIELD

The invention relates to a method for exhaust gas aftertreatment, and a device for producing a reducing agent for exhaust gas aftertreatment.

DETAILED DESCRIPTION

Figure 1:
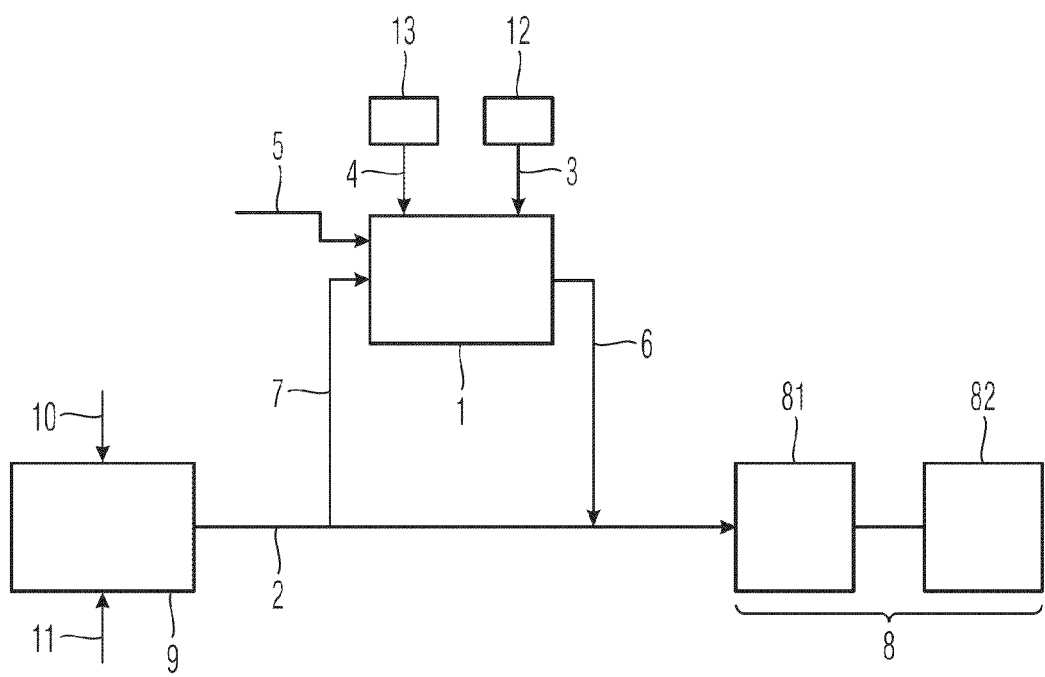
FIG. 1 is a schematic diagram of an embodiment of a device with a catalytic evaporator for exhaust gas aftertreatment.

Exhaust gas aftertreatment is the term used for methods in which the combustion gases are cleaned in a mechanical, catalytic or chemical way after they have left the combustion chamber of an internal combustion engine. Catalysts and reducing agents, such as ammonia, are used for reducing nitrogen oxides ($NO_x$) using the selective catalytic reduction (SCR) technology. For this purpose, an aqueous urea solution is injected, from which ammonia is produced by thermolysis and hydrolysis in the further course of transport through the exhaust gas pipe. Three-way catalysts can be used for reducing hydrocarbons and carbon monoxide.

The effectiveness of catalytic exhaust gas aftertreatment, i.e. the transformation or conversion rate, depends crucially on the operating temperature, in addition to other factors. Below about 250° C., virtually no reactions take place. This is the reason why even modern vehicles exhibit high pollutant emissions after a cold start. In these operating states, the catalyst is not yet at operating temperature and therefore converts the emitted pollutants only inadequately.

There are some strategies for raising the exhaust gas temperature quickly. For example, the catalyst can be placed close to the engine in the exhaust gas system. However, at least in the case of gasoline engines, this entails the risk of temperatures becoming too high in other operating states, e.g. near the rated power, since temperatures of 1000° C. destroy the catalyst. Good conversion rates and a long service life are given at 400° C. to 800° C. Alternatively, the exhaust gas temperature can be raised by electric heaters or by post-injections both inside the engine and/or in the exhaust gas system.

However, these measures have the effect of further increasing consumption after cold start and generating additional emissions.

Proceeding from the prior art, the object of the invention is therefore to provide a reducing agent for exhaust gas aftertreatment, possibly including selective catalytic reduction, which allows catalytic conversion at lower temperatures.

According to the invention, a method for exhaust gas aftertreatment, in particular for removing nitrogen oxides, is proposed, which is characterized by the following steps:
 a) providing a nitrogen oxide-containing raw exhaust gas,
 b) introducing the nitrogen oxide-containing raw exhaust gas into a catalytic evaporator,
 c) introducing a urea solution and a fuel simultaneously into the catalytic evaporator, as a result of which a reducing agent is obtained, and
 d) supplying the reducing agent to an exhaust gas aftertreatment system.

The method is used in particular when the exhaust gas contains nitrogen oxides. In this respect, a controlled system is envisaged. At engine map points where the exhaust gas contains more nitrogen oxides, it is switched on. At other engine map points where combustion produces few or tolerable amounts of nitrogen oxides, the system is not active. If it is not active, the supply for air and exhaust gas is stopped.

The nitrogen oxide-containing raw exhaust gas can be an untreated raw exhaust gas. It can also be a treated raw exhaust gas, which is e.g. treated with a particulate filter and/or diesel oxidation catalyst.

Steps b) and c) can be carried out at the same time. In step d), the reducing agent can be supplied directly to the exhaust gas aftertreatment system or by introducing it into the exhaust gas line leading from the engine to the exhaust gas aftertreatment system.

The method according to the invention was developed on the basis of the catalytic evaporation technology, which is known per se. This method uses nitrogen oxide-containing raw exhaust gas from an engine, liquid fuel and a urea solution. The catalytic conversion of the fuel in the catalytic evaporator generates heat within the system. In this way, the system becomes much more independent of engine operation. It thus becomes possible to produce reducing agent from the aqueous urea solution in a manner that is independent of the engine operation, in particular of exhaust gas temperature and exhaust gas mass flow. In addition, the method according to the invention generates from the added fuel hydrogen and hydrocarbons, e.g. ethene, which are used as additional reactant, i.e. reducing agent, for the SCR system of the EGA.

The supplied quantities of urea solution and fuel are the usual quantities used in the catalytic evaporator operation known per se.

The nitrogen oxide-containing raw exhaust gas added to the catalytic evaporator can be a part of the usual engine exhaust gases, i.e. a part of the engine exhaust gas flow can be branched off and provided in step a) as nitrogen oxide-containing raw exhaust gas which is introduced into the catalytic evaporator. Such a division can be effected by flaps or slides in the exhaust gas line, which can be driven accordingly. The raw exhaust gas can also be discharged directly from the engine and supplied to the catalytic evaporator.

With the method according to the invention it is advantageously achieved that, in contrast to heating the entire exhaust gas stream according to the prior art, only a small partial stream of the nitrogen oxide-containing raw exhaust gas needs to be heated. The conversion of the fuel also generates further heat that does not have to be introduced electrically. For the catalytic conversion, only the catalyst needs to be heated. The reactions can be controlled by varying the reactant streams.

In the method according to the invention, catalytic evaporators can be used that are known per se from the prior art. A person skilled in the art also knows how they can be operated in principle. An example of a catalytic evaporator that can be used in the method according to the invention is described in DE 10 2015 120 106 A1, to which full reference is made with respect to the design details and the mode of operation.

The catalytic evaporator used in the method according to the invention can have a catalyst, which can be applied e.g. to a support. The support with the catalyst can be placed in a reaction vessel in such a way that an intermediate space is formed between the inner surface of the reaction vessel and the catalyst surface.

In the operation of a catalytic evaporator, e.g. the liquid fuel can be added to the inner surface of the reactor wall of a catalytic evaporator while an oxidant, e.g. air, is supplied to the catalyst side. A small portion of the fuel oxidizes over the catalyst and the heat generated in this process is used to completely evaporate the fuel. The heat is mainly transferred by thermal radiation from the hot catalyst surface to the surface of the fuel. Here, the reactor wall to which the fuel is applied is colder than the fuel itself. No deposits or incrustations are formed.

The nitrogen oxide-containing raw exhaust gas supplied in step a) can contain residual oxygen. If the concentration of residual oxygen in the raw exhaust gas is sufficient, this can be sufficient as an oxidant to operate the catalytic evaporator. If the concentration of residual oxygen in the nitrogen oxide-containing raw exhaust gas is too low, it is possible in one embodiment to further introduce an oxidant into the catalytic evaporator in step c). This oxidant is an additional oxidant to the residual oxygen in the raw exhaust gas. An oxidant of this type can be oxygen or an oxygen-containing medium, in particular air. The amount of oxidant can here be chosen so as to achieve the usual amounts of oxidant in a catalytic evaporator. The air can come from the environment and optionally be charged by a turbocharger.

In one embodiment, the reducing agent formed in step c) includes ammonia ($NH_3$). In a further embodiment, the reducing agent can additionally comprise $H_2$, CO, hydrocarbons, e.g. ethene, and mixtures thereof.

By varying the reactant streams, namely fuel, urea solution, nitrogen oxide-containing raw exhaust gas, and optionally oxidant, it is possible to provide, in one embodiment, an individual reducing agent depending on the operating point in the engine map. The provision of this reducing agent in step c) of the method according to the invention increases the activity of the SCR system and thus the reduction of nitrogen oxides in the engine exhaust gas. The advantage is particularly effective at cold start and other operating points with a cold exhaust gas aftertreatment system.

In some embodiments, the urea solution used in step c) can be an aqueous urea solution, particularly a 32.5 percent urea solution. This solution has been found to be particularly suitable for exhaust gas aftertreatment systems.

In one embodiment, the exhaust gas aftertreatment comprises thermolysis and hydrolysis, which are known per se, and selective catalytic reduction, which is also known per se. The reducing agent obtained from the catalytic evaporator can be subjected first to hydrolysis and then to selective catalytic reduction. In a further embodiment, the exhaust gas aftertreatment, possibly including the selective catalytic reduction, can already be operated at a temperature of 170° C. (and possibly higher, e.g. 180° C., 190° C. or 200° C.). This means, therefore, that with the method according to the invention, exhaust gas aftertreatments can already start and be carried out at significantly lower temperatures than known in the prior art.

The method according to the invention can be used for converting nitrogen oxides for SCR systems of any type of internal combustion engines operating with an SCR system for the reduction of NOx emissions.

Furthermore, a subject matter of the invention id to use a catalytic evaporator, as described in detail above, in a method according to the invention, as also described in detail above.

Moreover, a reducing agent is provided that can be obtained by the method according to the invention. With respect to the production method and the composition, reference is made to the above explanations. In particular, the reducing agent includes hydrogen, hydrocarbons, in particular ethene, ammonia and/or carbon monoxide.

In addition, a device for producing a reducing agent for exhaust gas aftertreatment, e.g. including SCR, is described, the device comprising:

a) a catalytic evaporator, b) a raw exhaust gas supply line to the catalytic evaporator adapted to introduce nitrogen oxide-containing raw exhaust gas into the catalytic evaporator, c1) a fuel supply line to the catalytic evaporator adapted to introduce fuel into the catalytic evaporator, and a urea supply line to the catalytic evaporator adapted to simultaneously introduce the urea solution into the catalytic evaporator, or c2) a supply line adapted to introduce a mixture comprising urea and fuel into the catalytic evaporator; and d) a line adapted to introduce reducing agent produced in the evaporator into an exhaust gas system of an engine, the exhaust gas system leading to the EGA including SCR, if applicable, or directly into an exhaust gas aftertreatment system, in particular first into a device for hydrolysis and then into a device for selective catalytic reduction.

The term "adapted" used above indicates that the corresponding lines are designed in such a way that the materials to be supplied therein can be conducted without any negative effects, i.e. they are e.g. inert with respect to the materials to be conducted. Furthermore, the term "adapted" also indicates that the corresponding lines are connected to reservoirs that include the materials to be supplied.

By means of the above features c1) and c2) it is made clear that either the urea in the corresponding solution is added to the catalytic evaporator separately from the fuel (feature c1)) or that alternatively (feature c2)) a mixture of urea solution and fuel is introduced into the catalytic evaporator. A mixture can be introduced in particular if the fuel can be mixed with the urea solution. This is true e.g. when alcohols, such as ethanol, are used as a fuel.

In one embodiment of the device according to the invention, this device can further comprise an oxidant supply line to the catalytic evaporator adapted to introduce oxidant into the catalytic evaporator. Such a supply of oxidant, e.g. oxygen or air, can be required if the raw exhaust gas does not have the necessary residual oxygen concentration.

In one embodiment, the exhaust gas aftertreatment comprises a device for hydrolysis and a device for selective catalytic reduction which is known per se. For example, a device for hydrolysis can comprise a hydrolysis catalyst. A device for selective catalytic reduction can comprise e.g. a catalyst for the selective catalytic reduction. In this regard, the device for hydrolysis and the device for selective catalytic reduction can be provided in different housings from one another. This makes it possible to install these devices independently of one another at different locations of the device according to the invention.

Furthermore, a subject matter of the invention is to use the device as described above for exhaust gas aftertreatment, including a selective catalytic reduction.

With the above described device, the advantages obtained by the method according to the invention can be achieved in a simple and cost-effective manner.

The invention will be explained in more detail below with reference to drawings without limiting the general concept of the invention.

FIG. 1 is a schematic diagram of an embodiment of a device with a catalytic evaporator for exhaust gas aftertreatment.

Figure 2:
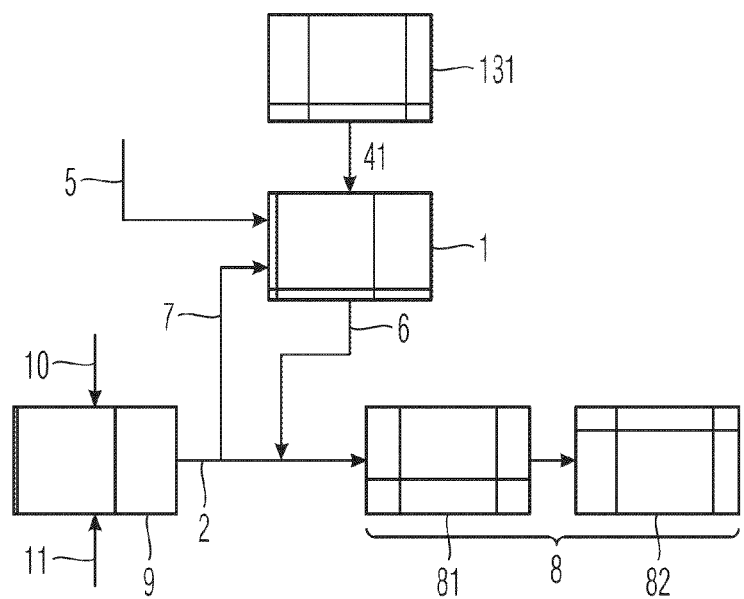
FIG. 2 shows a schematic diagram of a further embodiment of a device according to the invention.

FIG. 2 shows a schematic diagram of a further embodiment of a device according to the invention.

Figure 3:
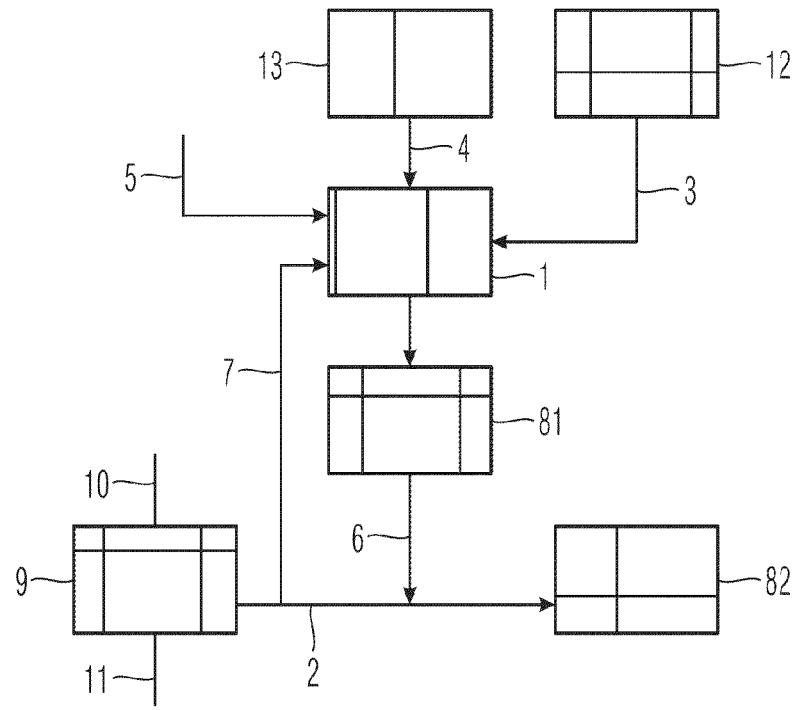
FIG. 3 shows a schematic diagram of another embodiment of a device according to the invention.

FIG. 3 shows a schematic diagram of another embodiment of a device according to the invention.

Figure 4:
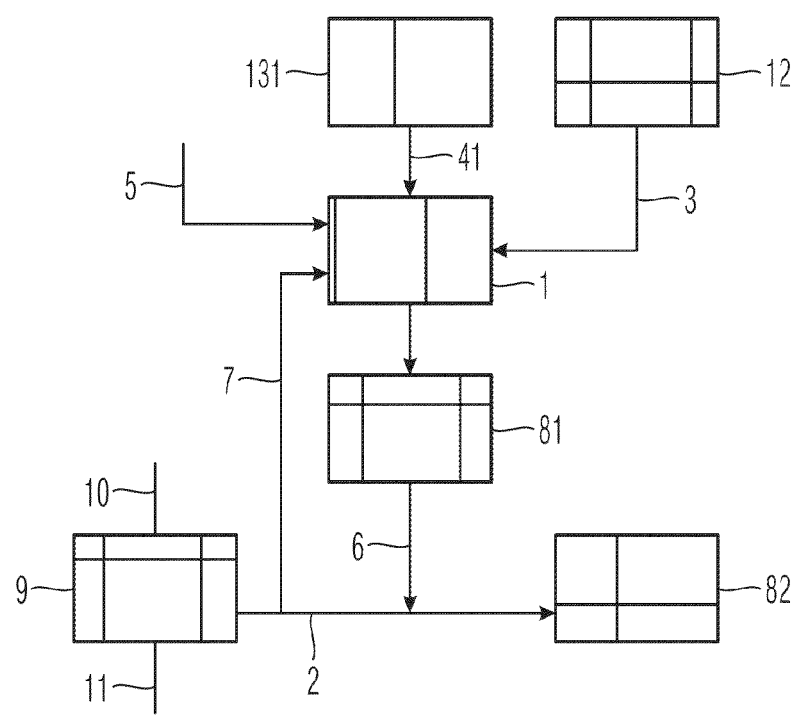
FIG. 4 shows a schematic diagram of an embodiment of the device according to the invention.

FIG. 4 shows a schematic diagram of an embodiment of the device according to the invention.

Figure 5:
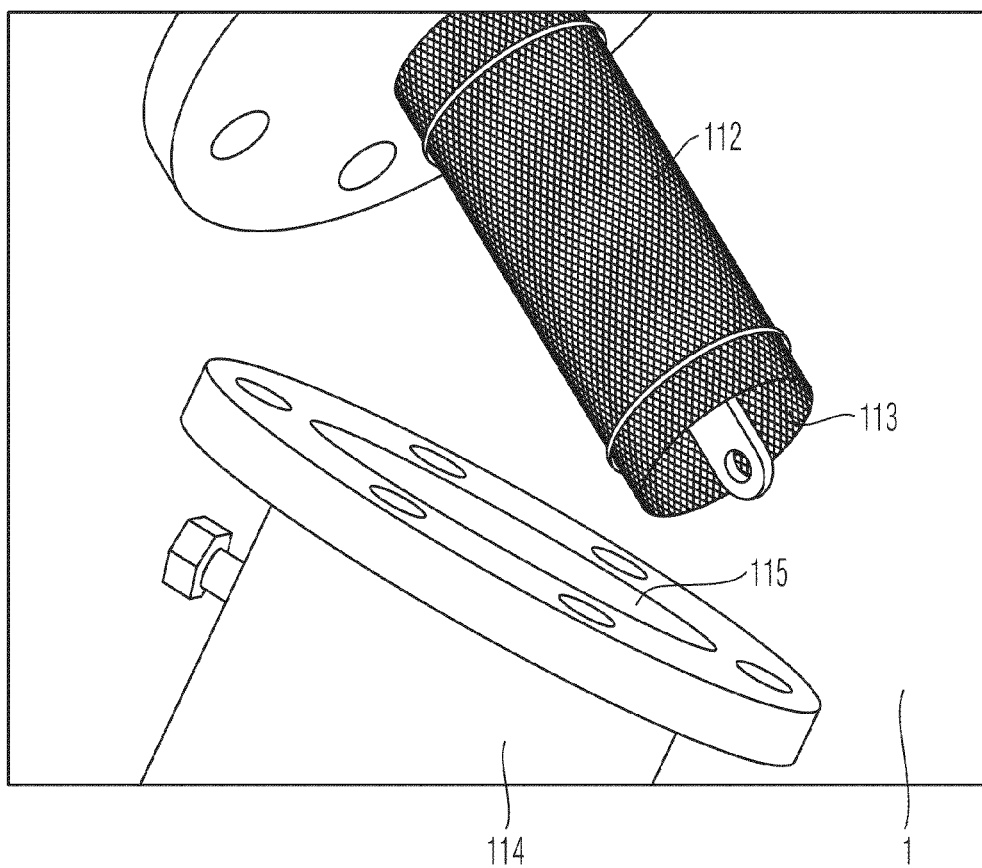
FIG. 5 shows a view of a catalytic evaporator usable by way of example.

FIG. 5 shows a view of a catalytic evaporator usable by way of example.

Figure 6:
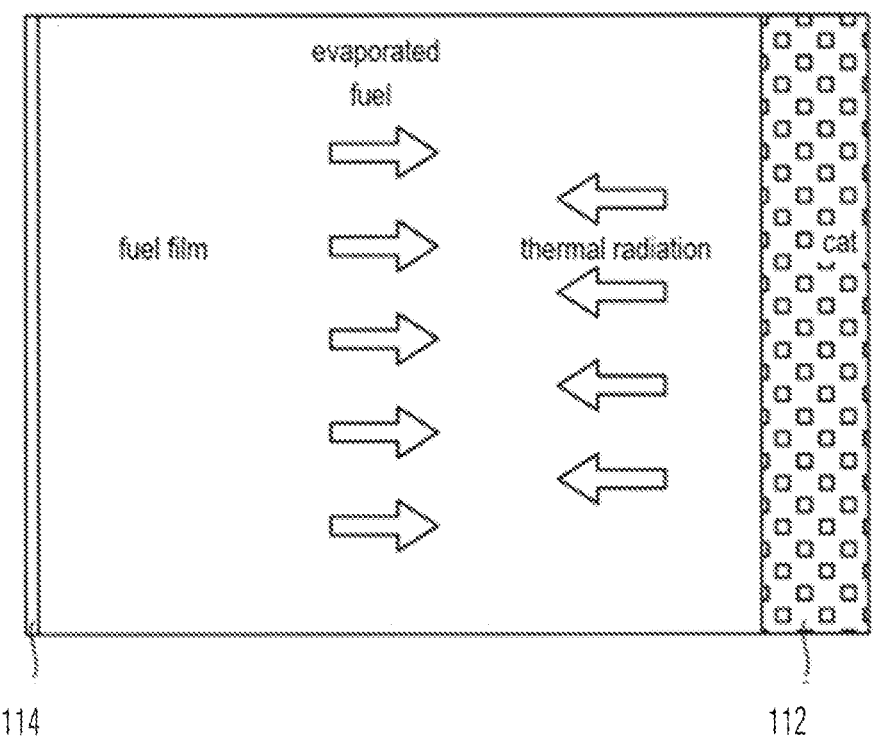
FIG. 6 shows the principle of operation of the catalytic evaporator in FIG. 2.

FIG. 6 shows the principle of operation of the catalytic evaporator in FIG. 2.

FIG. 1 schematically shows a device with a catalytic evaporator 1, which is explained in more detail in FIGS. 4 and 5 below, for exhaust gas aftertreatment. An engine 9, e.g. a diesel engine, is used in the usual manner to operate a motor vehicle, a fuel supply 10 and an air supply 11 being carried out. The resulting nitrogen oxide-containing raw exhaust gases are discharged from the engine through a line 2. These nitrogen oxide-containing raw exhaust gases from the engine 9 are supplied to a device for exhaust gas aftertreatment 8. The exhaust gas aftertreatment 8 includes a device for hydrolysis 81, e.g. a hydrolysis catalyst, and a device for the selective catalytic reduction 82. The device for hydrolysis 81 and the device the for selective catalytic reduction can be available in separate housings. At least a portion of the nitrogen oxide-containing raw exhaust gas is branched off via line 7 and supplied to the catalytic evaporator 1. Furthermore, the catalytic evaporator is supplied with the urea solution from a reservoir for a urea solution 13 via a urea supply line 4 to the catalytic evaporator 1. In addition, fuel is supplied to the catalytic evaporator 1 from a fuel reservoir 12 via a fuel supply line 3. Via an oxidant supply line 5, an oxidant, for example air, can be supplied to the catalytic evaporator 1, if necessary. The catalytic evaporator 1 produces the reducing agent, which can comprise in particular $NH_3$, $H_2$, hydrocarbons and CO and which is introduced into the exhaust gas system 2 of the engine 9 via a line 6.

FIG. 2 schematically shows a further embodiment of the device according to the invention, with identical components of FIG. 1 having the same reference signs so that reference is made to FIG. 1 with regard to the design embodiment and the mode of operation. As shown in FIG. 2, a mixture of urea and fuel is produced in space 131, and this mixture is then introduced into the catalytic evaporator 1 via the supply line 41. The prior mixing of urea and fuel can be applied in the case of fuels that are miscible with water, e.g. alcohols, such as ethanol.

FIG. 3 schematically shows a further embodiment of the device according to the invention, with identical components of FIGS. 1 and 2 having the same reference signs, so that reference is made to FIGS. 1 and 2 with respect to the design embodiment and the mode of operation. In the device of FIG. 3, the reducing agent obtained from the catalytic evaporator 1 is first introduced into the device for hydrolysis 81. The material obtained therefrom is then introduced into the exhaust gas system 2 and subsequently passed into the device for selective catalytic reduction 82.

FIG. 4 shows a further embodiment of the present invention. It corresponds to the device shown in FIG. 3, with a mixture of urea and fuel being produced in space 131, which mixture is then introduced into the catalytic evaporator 1 via supply line 41.

FIG. 5 shows a catalytic evaporator 1 as can be used in the method according to the invention. The catalytic evaporator 1 has a catalyst 112 which is applied to a metal mesh 113. It is possible to use as catalyst 112 and as metal mesh 113 materials that are known from the prior art. The metal mesh 113 with the catalyst 112 can be present in a reaction vessel 114. For reasons of overview, the diagram in FIG. 5 is shown in such a way that the catalyst 112 with the metal mesh 113 is pulled out of the reaction vessel 114. If the catalyst 112 with the metal mesh 113 is pushed into the reaction vessel, an intermediate space is formed on the metal mesh 113 between the inner surface 115 of the reaction vessel 114 and the surface of the catalyst 112.

FIG. 6 schematically shows the mode of operation of the catalytic evaporator illustrated in FIG. 2. The fuel is applied to the lower surface of the reactor vessel 114, while the nitrogen oxide-containing raw exhaust gas and, if necessary, a further oxidant are supplied to the catalyst side. A small portion of the fuel oxidizes over the catalyst 112 and the heat generated in this process is used to completely evaporate the fuel. The heat is predominantly transferred by thermal radiation from the hot surface of the catalyst 112 to the surface of the fuel film. The wall of the reactor vessel 114, to which the fuel is applied, can here be colder than the fuel itself. Thus, no deposits or incrustations are formed.

Of course, the invention is not limited to the embodiment illustrated in the drawings. Therefore, the above description should not be regarded as restrictive but as explanatory. The following claims are to be understood in such a way that a stated feature is present in at least one embodiment of the invention. This does not exclude the presence of further features. If the description or the claims define "first" and "second" features, this is done to distinguish between two similar features without determining a ranking order.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A method for exhaust gas aftertreatment, comprising at least the steps of:
   a) providing a nitrogen oxide-containing raw exhaust gas,
   b) introducing the nitrogen oxide-containing raw exhaust gas into a catalytic evaporator,
   c) introducing a urea solution and a fuel simultaneously into the catalytic evaporator, as a result of which a reducing agent is obtained, and
   d) supplying the reducing agent to an exhaust gas aftertreatment system.

2. The method of claim 1, wherein in step c) an oxidant is introduced into the catalytic evaporator.

3. The method of claim 1, wherein the reducing agent includes ammonia.

4. The method of claim 1, wherein the reducing agent includes any of hydrogen, carbon monoxide, and hydrocarbons.

5. The method of claim 1, wherein the urea solution is a 32.5% urea solution.

6. The method of claim 1, wherein the composition of the reducing agent is adjusted via the introduction of the urea solution, the fuel, the nitrogen oxide-containing raw exhaust gas and/or the oxidant.

7. The method of claim 1, wherein the exhaust gas aftertreatment comprises thermolysis and hydrolysis as well as selective catalytic reduction.

8. The method of claim 1, wherein the exhaust gas aftertreatment can be operated at a temperature of about 170° C. or higher.

9. A device for producing a reducing agent for exhaust gas aftertreatment, the device comprising:
   a) a catalytic evaporator,
   b) a raw exhaust gas supply line to the catalytic evaporator, being adapted to introduce nitrogen oxide-containing raw exhaust gas into the catalytic evaporator,
   c1) a fuel supply line to the catalytic evaporator, being adapted to supply fuel into the catalytic evaporator, and a urea supply line to the catalytic evaporator, being adapted to simultaneously introduce a urea solution into the catalytic evaporator,
   d) a line configured to introduce the resulting reducing agent into an exhaust gas system of an engine or into an exhaust gas aftertreatment system.

10. The device of claim 9, comprising further an oxidant supply line to the catalytic evaporator, the oxidant supply line configured to introduce an oxidant into the catalytic evaporator.

11. The device of claim 9, wherein the exhaust gas aftertreatment system comprises a device for hydrolysis and a device for selective catalytic reduction.

12. A device for producing a reducing agent for exhaust gas aftertreatment, the device comprising:
   a) a catalytic evaporator,
   b) a raw exhaust gas supply line to the catalytic evaporator, being adapted to introduce nitrogen oxide-containing raw exhaust gas into the catalytic evaporator,
   c2) a supply line being adapted to introduce a mixture, comprising of urea and fuel, into the catalytic evaporator, and
   d) a line configured to introduce the resulting reducing agent into an exhaust gas system of an engine or into an exhaust gas aftertreatment system.

13. The device of claim 12, further comprising an oxidant supply line to the catalytic evaporator, the oxidant supply line configured to introduce an oxidant into the catalytic evaporator.

14. The device of claim 12, wherein the exhaust gas aftertreatment system comprises a device for hydrolysis and a device for selective catalytic reduction.

* * * * *